UNITED STATES PATENT OFFICE.

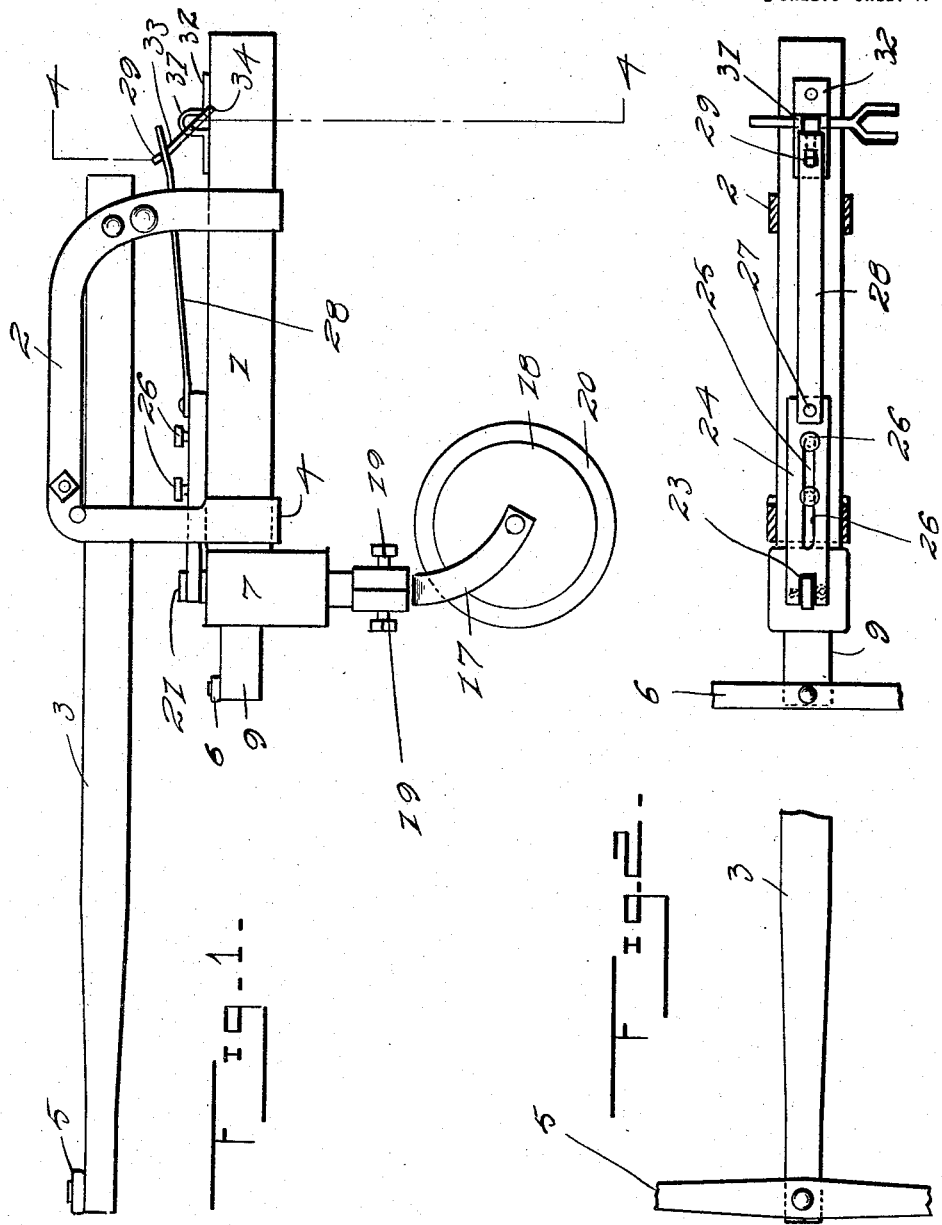

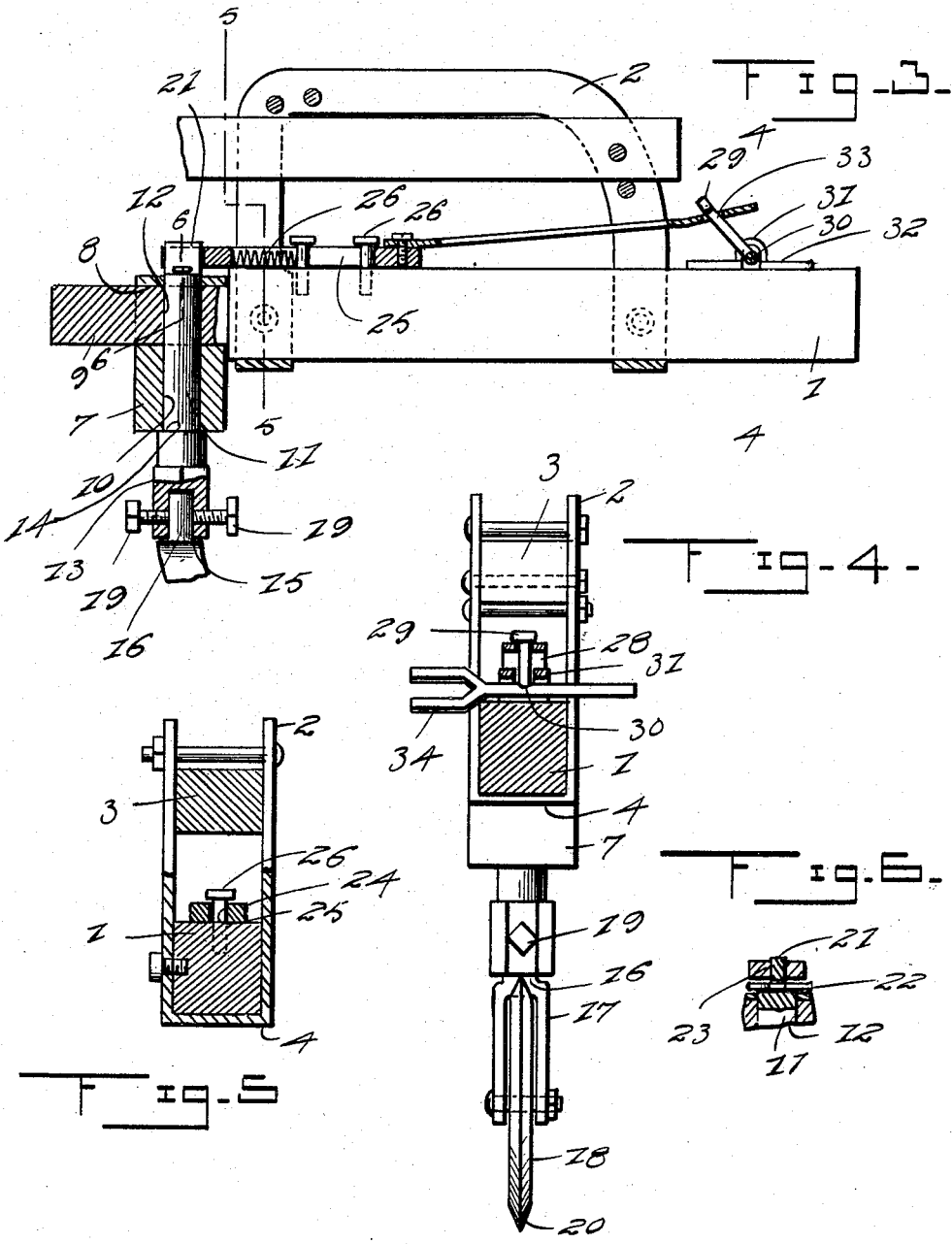

HOWARD B. HALE, OF ALLIANCE, NEBRASKA.

MOWER-TRUCK.

1,204,975.  Specification of Letters Patent.  Patented Nov. 14, 1916.

Application filed March 18, 1916. Serial No. 85,086.

*To all whom it may concern:*

Be it known that I, HOWARD B. HALE, a citizen of the United States, residing at Alliance, in the county of Box Butte and State of Nebraska, have invented certain new and useful Improvements in Mower-Trucks; and I do hereby declare the following to be a full, clear, and exact description of the invention, such as will enable others skilled in the art to which it appertains to make and use the same.

The invention relates to a mower truck.

The object of the present invention is to provide a simple, practical and efficient mower truck adapted to be readily applied to an ordinary mowing machine and capable of supporting the weight of the front portion of the same and of relieving the necks of the draft animals of strain and of counteracting side draft.

A further object of the invention is to provide a mower truck of this character adapted to permit a mowing machine to be readily turned at the corner or end of a field and capable of effectually preventing the draft animals from coming in contact with the cutting mechanism.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings, Figure 1 is a side elevation of a mower truck constructed in accordance with this invention. Fig. 2 is a plan view of the same. Fig. 3 is a longitudinal sectional view. Fig. 4 is a transverse sectional view taken substantially on the line 4—4 of Fig. 1. Fig. 5 is a similar view on the line 5—5 of Fig. 3. Fig. 6 is a detail sectional view on the line 6—6 of Fig. 3.

Like numerals of reference designate corresponding parts in the several figures of the drawings.

In the accompanying drawings in which is illustrated the preferred embodiment of the invention, the mower truck comprises in its construction, an auxiliary or short tongue 1 designed to be secured in any suitable manner to a mower (not shown) and having secured to it a bracket 2 to which a main tongue 3 is secured. The bracket 2 which may be constructed of any suitable metal preferably consists of a casting and is composed of two approximately inverted U-shaped sides arranged in parallelism and connected at the lower ends of the legs of the sides by transversely disposed integral portions 4 which are fitted against the lower face of the auxiliary tongue 1. The sides of the bracket are fitted against the sides of the auxiliary tongue and are suitably secured to the same and extend upwardly therefrom as clearly shown in Fig. 4 of the drawings. The rear portion of the main tongue is fitted between and is suitably secured to the sides of the supporting bracket and it is located above and arranged in spaced relation with the auxiliary tongue. The main tongue may be of any desired construction and it is designed to be equipped at its front end with a neck yoke 5 and a double tree is mounted on the front portion 9 of the main tongue 1.

The auxiliary tongue is provided at the front portion with a block or sleeve 7 having a horizontal opening 8 to fit the front portion of the auxiliary tongue and the said front portion 9 of the auxiliary tongue is reduced to extend through the sleeve or block 7 and to form a rear shoulder to fit against the same. The block or sleeve 7 is also provided with a vertical opening 10 for the reception of a vertical pivot 11 which also passes through the auxiliary tongue. The auxiliary tongue is provided with an opening 12 which registers with the opening 10 and the said pivot 11 and is provided at its lower end with an enlargement 13 forming a shoulder 14 to fit against the lower end of the block or sleeve 7 and provided with a lower socket 15. The socket 15 which extends upwardly from the lower end of the enlargement of the pivot is adapted to receive a stem 16 of a fork 17 in which a caster wheel 18 is mounted. The stem 16 is rounded to form a pivot and the walls of the socket 15 are pierced by set screws 19 for engaging the stem of the fork 17 for securing the caster wheel either in a straight position or at a slight angle when it is desired to counteract side drafts. The caster wheel is preferably provided with an oppositely beveled periphery 20 but it may be constructed in any other desired manner. The beveled periphery will enable the caster wheel to engage the soil when it is set at an angle as before explained.

The vertical pivot 10 is provided with a reduced flat upper end 21 which is pierced by a cotter pin 22 and which is adapted to be engaged by a recessed or bifurcated portion 23 of a slide 24 movable longitudinally of the auxiliary tongue into and out of engagement with the reduced upper portion of the pivot and adapted to lock and release the latter. The slide is provided with a longitudinal slot 25 through which passes headed fastening devices 26 for mounting the slide upon the auxiliary tongue and the said slot also receives a coiled spring 26 interposed between the front wall of the slot and the adjacent fastening device and adapted to urge the slide forwardly for automatically returning the slide into engagement with the reduced upper end of the vertical pivot, after having been withdrawn from such engagement to permit the caster wheel to function as such at the end of a row or the side of a field where it is necessary to turn the mowing machine. The rear end of the slide is connected by a rivet 27 or other suitable fastening device to the front end of a metallic strip 28 which extends rearwardly to an arm 29 of a rock shaft 30. The rock shaft 30 is journaled in suitable bearings 31 of a plate 32 and the arm 29 extends through an opening 33 in the rear portion of the connecting strip 28. One end of the rock shaft is provided with a forked portion 34 forming an enlargement and arranged at an inclination to form a treadle or foot plate and adapted to be operated by the foot of the driver to partially rotate the rock shaft and withdraw the slide from engagement with the pivot. The bearing plate 32 is secured to the upper face of the auxiliary tongue at the rear portion thereof and the arm 29 extends between the spaced bearings 31.

What is claimed is:

1. A mower truck including an auxiliary tongue, a caster wheel supporting the outer portion of the auxiliary tongue and having a pivot, a slidable member mounted on the auxiliary tongue and arranged to lock the pivot against rotary movement, means for urging the slidable member toward the pivot and an operating device connected with the slidable member for withdrawing the same from engagement with the pivot, and a main tongue carried by the auxiliary tongue and extending in advance of the same.

2. A mower truck including an auxiliary tongue, a caster wheel having a pivot and supporting the front end of the auxiliary tongue, said pivot having a reduced portion, a slide mounted on the auxiliary tongue and having a bifurcated front end to engage with the reduced portion of the pivot, a spring for urging the slide forwardly, a rock shaft having a pedal and provided with an arm, means for connecting the arm with the slide, and a main tongue carried by the auxiliary tongue.

3. A mower truck including an auxiliary tongue, a bracket composed of spaced approximately U-shaped sides fitted against the sides of the auxiliary tongue and extending upwardly therefrom and having transverse connecting portions, a main tongue mounted between the sides of the bracket and extending in advance of the auxiliary tongue, a caster wheel having a pivot mounted on the auxiliary tongue and means for holding the pivot against rotary movement.

4. A mower truck including an auxiliary tongue, a sleeve mounted on the auxiliary tongue and having a vertical opening, a vertical pivot extending through the sleeve and through the auxiliary tongue and provided at its lower end with a socket, a caster wheel provided with a stem fitted in the said socket, means for clamping the stem in the socket, means for holding the pivot against rotary movement, and a main tongue carried by the auxiliary tongue.

In testimony whereof I affix my signature in presence of two witnesses.

HOWARD B. HALE.

Witnesses:
HATTIE RENSWOLD,
MILTON L. KINCAID.

Copies of this patent may be obtained for five cents each, by addressing the "Commissioner of Patents, Washington, D. C."